(12) United States Patent
Martin

(10) Patent No.: US 7,783,539 B2
(45) Date of Patent: Aug. 24, 2010

(54) DERIVATIVE CURRENCY-EXCHANGE TRANSACTIONS

(75) Inventor: Wayne Joseph Martin, Coral Springs, FL (US)

(73) Assignee: First Data Corporation, Greenwood Village, CO (US)

( * ) Notice: Subject to any disclaimer, the term of this patent is extended or adjusted under 35 U.S.C. 154(b) by 889 days.

(21) Appl. No.: 11/283,532

(22) Filed: Nov. 18, 2005

(65) Prior Publication Data

US 2006/0124729 A1 Jun. 15, 2006

Related U.S. Application Data

(63) Continuation-in-part of application No. 10/984,354, filed on Nov. 8, 2004, now abandoned.

(51) Int. Cl.
    *G06F 19/00* (2006.01)
(52) U.S. Cl. .............................. 705/35; 705/37; 705/39
(58) Field of Classification Search ............... 705/1–80; 235/379, 381; 715/751
    See application file for complete search history.

(56) References Cited

U.S. PATENT DOCUMENTS

| 2001/0025265 A1* | 9/2001 | Takayasu ..................... 705/36 |
| 2001/0049651 A1 | 12/2001 | Selleck |
| 2002/0055907 A1* | 5/2002 | Pater et al. .................... 705/39 |
| 2002/0143634 A1 | 10/2002 | Kumar et al. |
| 2003/0097321 A1 | 5/2003 | Arikawa et al. |
| 2004/0153406 A1* | 8/2004 | Alarcon-Luther et al. ..... 705/41 |
| 2004/0199421 A1* | 10/2004 | Oda et al. ...................... 705/14 |
| 2004/0260647 A1* | 12/2004 | Blinn et al. .................... 705/41 |
| 2006/0149561 A1* | 7/2006 | Govender ....................... 705/1 |

OTHER PUBLICATIONS x-rate.com; http://web.archive.org/web/20030612161347/http://www.x-rates.com/; Jun. 11, 2003; p. 1.*
Gopinath, Itskhoki and Rigobon, Discussion of "currency Choice and Exchange Rate Pass-Through", Oct. 19, 2007, web, pp. 1-15.*
U.S. Appl. No. 10/984,354, Office Action dated Jul. 9, 2007, 9 pages.
International Search Report and Written Opinion of the International Search Authority dated Nov. 1, 2007, corresponding to PCT International Application No. PCT/US06/43490, filed Nov. 7, 2006.
U.S. Appl. No. 10/984,354, Office Action dated Nov. 25, 2008, 13 pages.

* cited by examiner

*Primary Examiner*—James P Trammell
*Assistant Examiner*—Marissa Liu
(74) *Attorney, Agent, or Firm*—Townsend and Townsend and Crew LLP

(57) ABSTRACT

Methods are provided for executing a money transfer from a first party to a second party. Customer instructions are received at a host system to stage the money transfer. The instructions include specification of an amount of money to be transferred, specification of a first currency in which the funds are to be provided by the first party, specification of a second currency different from the first currency in which the funds are to be received by the second party, and specification of a trigger currency exchange rate. Confirmation is received that the funds have been collected from the first party. A currency exchange rate between the first currency and the second currency is monitored. It is determined whether the monitored currency exchange rate is at least as favorable for the first party as the trigger currency exchange rate.

20 Claims, 8 Drawing Sheets

[Customer Buys Stored-Value Token with $100 Value]

(a) 2/1

| Cash Value | Futures | Options |
|---|---|---|
| $100 | | |
| | | |
| | | |

[Customer Buys Goods for $50]

(b) 2/15

| Cash Value | Futures | Options |
|---|---|---|
| $50 | | |
| | | |
| | | |

[Customer Adds $200 Value to Token]

(c) 3/1

| Cash Value | Futures | Options |
|---|---|---|
| $250 | | |
| | | |
| | | |

[Customer Enters Futures Contract with ABC Company]

(d) 3/15

| Cash Value | Futures | Options |
|---|---|---|
| $250 ($90) | ABC  100 gal.  (3/26 - 4/2)  $160 | |
| | | |
| | | |

[Customer Attempts to Buy Goods for $100]

(e) 3/20

| Cash Value | Futures | Options |
|---|---|---|
| $250 ($90) | ABC  100 gal.  (3/26 - 4/2)  $160 | |
| | | |
| | | |

Fig. 4A

DERIVATIVE CURRENCY-EXCHANGE TRANSACTIONS

CROSS REFERENCE TO RELATED APPLICATION

This application is a continuation-in-part of U.S. patent application Ser. No. 10/984,354, entitled "METHODS AND SYSTEMS FOR IMPLEMENTING DERIVATIVE TRANSACTIONS," filed Nov. 8, 2004 by Wayne Joseph Martin, the entire disclosure of which is incorporated herein by reference for all purposes.

BACKGROUND OF THE INVENTION

This application relates generally to derivative transactions. More specifically, this application relates to methods and systems for implementing derivative transactions.

As used herein, references to a "derivative transaction" are intended to refer to a transaction derived at least in part from another transaction that may be executed in the future. Execution of derivative transactions generally take the form of execution of an underlying contract between two parties. One example of a derivative transaction is a "futures transaction," which is intended to refer herein to a transaction based on a futures contract between two parties specifying a date and certain terms for execution of the futures contract. Another example of a derivative transaction is an "option transaction," which is intended to refer herein to a transaction based on an option contract between two parties securing the right of at least one of the parties to execute a defined transaction.

The derivatives market has developed a great deal of complexity and is most often associated with relatively sophisticated investment strategies. Relatively few individual consumers and small business make practical use of the underlying derivatives as a mechanism for managing costs in a predictable way. Yet this ability is a primary benefit of the derivatives themselves. The very complexity associated with managing derivatives has acted as a barrier to their practical use by individuals and small businesses. The result has been the development of system that is generally more concerned with the trade of derivatives and how profit may be generated by their purchase and sale, rather than their use as cost-management instruments.

There is accordingly a general need in the art for methods and systems for implementing derivative transactions that provide more convenience and ease of execution and use.

BRIEF SUMMARY OF THE INVENTION

Embodiments of the invention provide methods for executing a money transfer from a first party to a second party. Customer instructions are received at a host system to stage the money transfer. The instructions include specification of an amount of money to be transferred, specification of a first currency in which the funds are to be provided by the first party, specification of a second currency different from the first currency in which the funds are to be received by the second party, and specification of a trigger currency exchange rate. Confirmation is received that the funds have been collected from the first party. A currency exchange rate between the first currency and the second currency is monitored. It is determined whether the monitored currency exchange rate is at least as favorable for the first party as the trigger currency exchange rate.

In different embodiments, the amount of money to be transferred may be specified in the first currency or may be specified in the second currency. In different embodiments, the customer instructions may be received at the host system over the Internet or from an in-person money-transfer location.

In some embodiments, a determination is made that the monitored currency exchange rate is at least as favorable as the trigger currency exchange rate. In such an instance, the funds are converted from the first currency to the second currency at the monitored currency exchange race and the converted funds are transferred to the control of the second party. The monitored currency exchange rate may sometimes be more favorable than the trigger currency exchange rate. In such a case, the amount of money to be transferred may be increased by an excess corresponding to a difference between the monitored currency exchange rate and the trigger currency exchange rate. Alternatively, a refund of the excess may be initiated.

In other embodiments, it may be determined that the monitored currency exchange rate has not become at least as favorable as the trigger currency exchange rate within a defined time. In some such instances, the funds may be refunded to the customer. In another embodiment, the currency exchange rate between the first currency and the second currency may be monitored for a second defined time. In a further embodiment, the funds may nonetheless be converted from the first currency to the second currency at the monitored currency exchange rate, with the converted funds being transferred to the control of the second party.

In another set of embodiments, a method is provided for executing a transaction between a first party and a second party. Instructions are received at a host system to stage the transaction. The instructions includes specification of terms of the transaction and specification of a trigger value of a fluctuating parameter. The terms of the transaction are dependent on a value of the fluctuating parameter. Confirmation is received that funds have been collected from the first party in support of the transaction. Thereafter, the value of the fluctuating parameter is monitored. It is determined whether the monitored value of the fluctuating parameter is at least as favorable to the first party as the trigger value.

It one such embodiment, it is determined that the monitored value of the fluctuating parameter is at least as favorable to the first party as the trigger value. In such an embodiment, the transaction is executed with terms in accordance with the monitored value of the fluctuating parameter. In another embodiment, it is determined that the monitored value of the fluctuating parameter is not as favorable to the first party as the trigger value. In such an embodiment, a refund of the funds to the first party is initiated.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 4A-4C illustrate the status of certain information that may be maintained in implementing methods of the invention in an exemplary embodiment;

DETAILED DESCRIPTION OF THE INVENTION

1. Stored-Value-Account Implementations

Embodiments of the invention provide methods and systems for handling derivative transactions by using techniques developed for implementing stored-value accounts. A typical stored value account operates by providing a host system that manages the stored-value account, maintaining records of such information as how much value exists in the account, where the value may be used, etc. Generally, a token is provided to an owner of the stored-value account, such as in the form of a magnetic-stripe card, although other tokens may be used, such as in the form of a chip card, rf device, and the like. When a transaction is to be executed using the value stored in the account, the customer provides the token at the time of the transaction, and information is read from the token to identify the account. This identifier is transmitted to the host system, which retrieves records of the amount of value available for use and confirms that the transaction may proceed. The host system debits the value applied during the transaction from the account and performs settlement functions to ensure that the other party to the transaction is credited with that value.

Embodiments of the invention use such an arrangement for the implementation of derivative transactions. For purposes of illustration, consider the case of a small business owner who has a generally predictable need for a commodity, such as gasoline. The business owner would like to take advantage of the periodically lower costs for the gasoline by buying greater volumes of it, but lacks storage capacity to hold significant volumes. A derivative would provide a convenient mechanism for the business owner to manage costs, such as by purchasing futures of gasoline at lower costs in accordance with the predicted needs. Similarly, the business owner might sometimes recognize the possibility of a higher-than-average short-term need for gasoline, in which case costs may be effectively managed through purchase of an option. Use of a stored-value arrangement significantly increases the ease of entering and managing such derivative-transaction arrangements.

Figure 1:
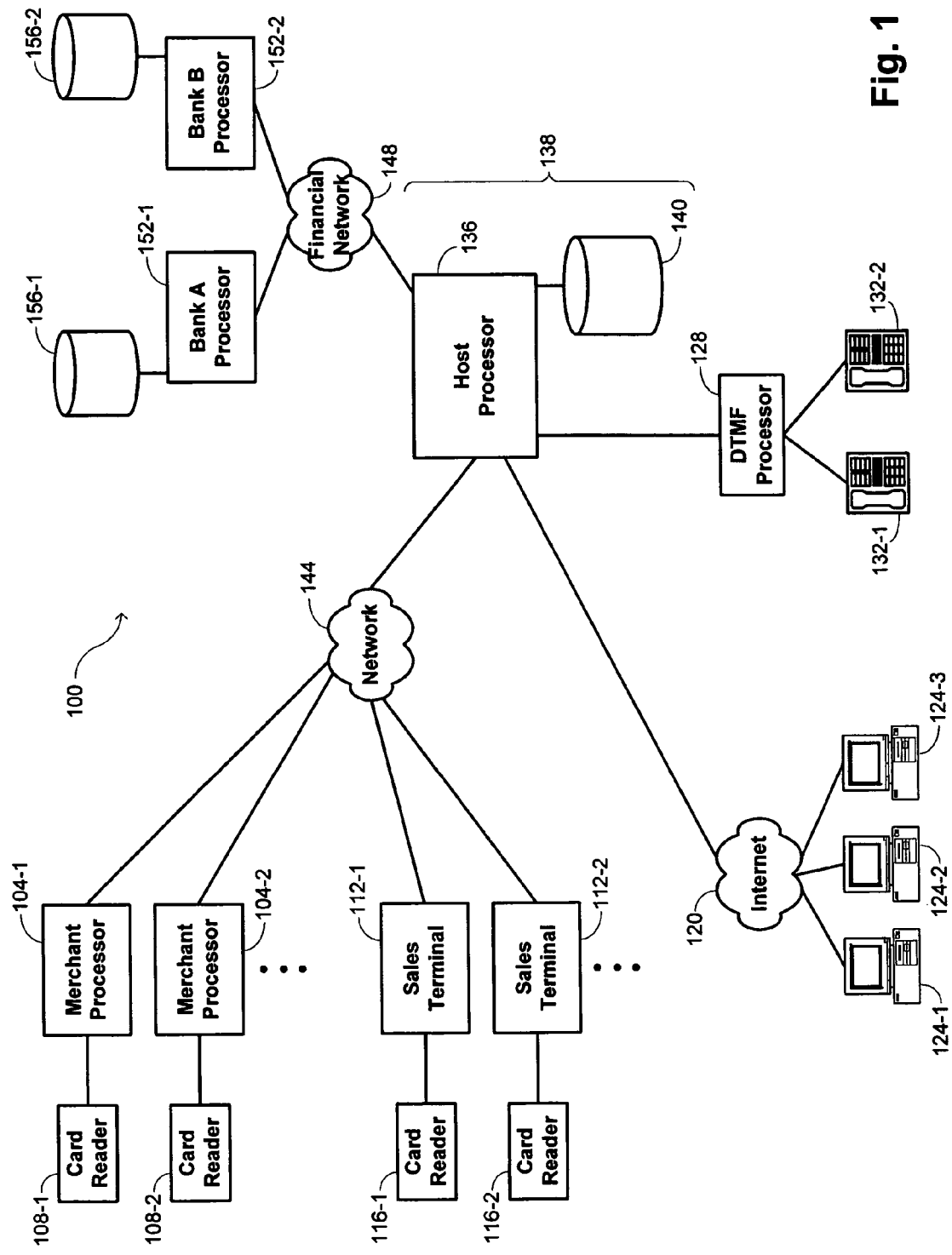
FIG. 1 is a block-diagram representation of an exemplary architecture for implementing methods of the invention in an embodiment.

FIG. 1 provides a general overview of an architecture 100 that may be used in implementing embodiments of the invention. The host system 138 that coordinates the transfer of information and that maintains account records comprises a host processor 136 and a data store 140. The host system 138 is provided in communication with a number of other elements of the architecture through communications links with the host processor 136. The communications links may be electrical, optical, wireless, or any other type of communications link known to those of skill in the art.

Communications with point-of-sale devices, which may be used when a stored-value token is initially acquired or when a transaction involving the stored-value token is executed, may be routed through a network 144. Because of the sensitive financial nature of the communications, the network 144 usually comprises a secure network. The drawing distinguishes between merchant processors 104, which refer herein to parts of point-of-sale devices that are used in communicating information as part of executing a transaction, and sales terminals 112, which refer herein to parts of point-of-sale devices used when a stored-value token is initially provided to a customer. This distinction is largely conceptual since the same physical devices may usually be used for either or both functions. For purposes of illustration, the point-sale-devices are shown as including a card reader 108 or 116 in communication with the merchant processor 104 or sales terminal 112 for reading magnetic-stripe information in those embodiments where the stored-value token comprises a magnetic-stripe card. In other embodiments, other reading devices as appropriate for the type of token may be used instead. The point-of-sale devices may generally take a variety of different forms, including devices that may be operated by merchant clerks or may be self-operated by customers. Examples of point-of-sale devices that have varied functionality are described in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

The host processor 136 may also be provided in communication with one or more financial-institution processors 152, each of which functions as part of a system that maintains accounts on behalf of account holders on associated data stores 156. The financial institutions are identified as banks in the drawing, but may more generally be any type of financial institution, such as a trust company, and credit union, and the like. Communications between the host processor 136 and the financial-institution processors 152 take place over a financial network 148, which is generally provided as a secure network to protect the confidential and sensitive nature of the financial information that is routed.

In some instances, the host system 138 may additionally be provided in communication with other networks that permit customers to access information regarding the stored-value accounts that are maintained on the data store 140. This additional capability is generally of an administrative nature to provide functionality that permits customers to be active in the administration of these accounts. In some instances, more substantive capabilities may also be provided, enabling the customer to transfer funds between a stored-value account maintained by the host system 138 with an account maintained by one of the financial institutions. Other capabilities that might be provided include the ability to make bill payments with stored-value accounts through a network connection with the host system 138, and the like. Such additional networks may be provided in a number of different ways, such as through the use of a public network like the internet 120 that provides communications between the host processor 136 and a customer computers 124. Alternatively or additionally, the architecture 100 may support an interface to process touch-tone commands from customer telephones 132 through a dual-tone multiple-frequency ("DTMF") processor 128. The DTMF processor 128 translates telephone touch tones to enable a customer to provide instructions through a telephone 132 and transmits audible responses to the customer. Still other mechanisms that may be used in different embodiments include voice-recognition processors, cable processors, and the like. The information-security issues related to the use of public networks like the internet may be different because of the greater risk of interception than over the private networks 144 and 148. A variety of techniques known to those of skill in the art may be used to provide enhanced security, including encryption of data transmitted over such public networks. Such techniques may be used with the transmission of information also over the private networks 144 and 148 to further provide strengthened security of the information.

Figure 2:
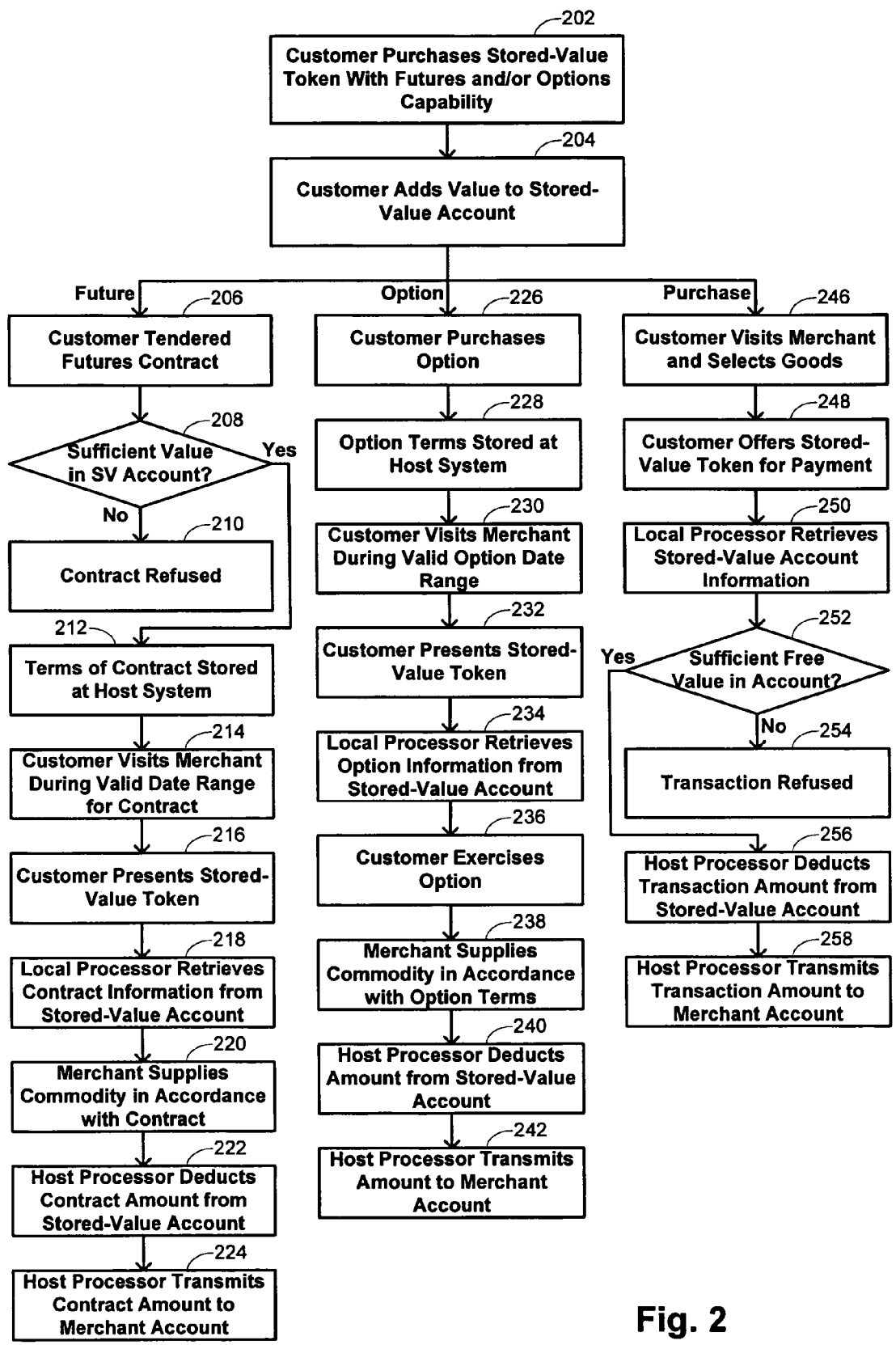
FIG. 2 is a flow diagram that summarizes various methods for using stored-value tokens as part of the methods of the invention.

An overview of methods of the invention that may be implemented with an architecture like the one shown in FIG. 1 are summarized with the flow diagram of FIG. 2. For purposes of illustration, the flow diagram shows three different types of transactions that may be executed using the stored-value token, including derivative transactions that are illustrated for a futures transaction and for an option transaction, and also including a purchase transaction using stored value. The execution of a purchase transaction is illustrated explicitly since some embodiments may provide limitations on such a transaction as part of implementing certain types of derivative transactions. For instance, a portion of the stored value for an account may be frozen when the derivative includes a future contractual obligation to ensure that there is sufficient funds support for the contractual obligation. For instance, where the derivative transaction is a futures transaction obligating the customer to make a future purchase, the value needed for that purchase may be earmarked as inaccessible for use in purchase transactions. In contrast, where the derivative transaction is an option transaction, there is no future obligation on the part of the customer to make a purchase so no value is specifically earmarked.

These different features may be illustrated by considering the different paths through the flow diagram of FIG. 2. The flow diagram begins with the initial establishment of a customer's stored-value account, as indicated at block 202 with the purchase of a stored-value token equipped for use with derivative transactions. In some instances, a purchased token may have value that has been preloaded in the account, usually an amount that is equal to the purchase price of the token. In any event, the customer may be provided with the capability of adding value to the account, as indicated at block 204, to set a particular value for the account. Adding value may be performed in any of several different ways. For instance, the customer may use the administrative connections described in connection with FIG. 1 to supply a financial account from which value may be transferred to the stored-value account identified by the token. In such instances, the host processor 136 coordinates the value transfer in accordance with instructions from the customer and by using known techniques to identify the customer's authority to initiate debit instructions to a financial account held at a financial institution. Such techniques may include verification of a customer's personal identification number ("PIN") associated with the account, and the like. Alternatively, the customer may present the token with a tendered value amount at a point-of-sale location, such as at one of the sales terminals 112 identified in FIG. 1. A clerk may swipe the card through the card reader 116 to extract the account identifier, which is transmitted to the host processor 136 to identify the account. The clerk may then accept tendered value from the customer, such as in the form of cash, a check, a credit card, etc. and key in the amount received so that the host system 138 updates the value associated with the identified account. Further ways of adding value may include similar processes that omit the involvement of the clerk by having the customer interact with a self-service device equipped with such devices as a cash collector, check reader, and the like to accept the tendered value.

Once a stored-value token has been provided to a customer and the corresponding account includes value, the token may be used in the execution of derivative transactions and purchase transactions. The left column of FIG. 2 illustrates the use of the token as part of a futures transaction, such as where the customer is tendered a futures contract at block 206. Such a contract typically includes terms specifying a date or date range when the contract is to be executed, the goods to be provided to the customer from a seller at the time of execution, and the amount of value to be provided by the customer to the seller at the time of execution. Because a specific amount of value will be needed to support the contract, a check is made at block 208 whether the stored-value account identified by the token has sufficient value. This may be done at any of the point-of-sale devices described in connection with FIG. 1 by extracting an identifier from the token and transmitting it to the host system 138 for retrieval of account information. If the account lacks sufficient value, the contract may be refused by the system at block 210.

If the account does have sufficient value, the terms of the contract are stored at the host system 138 at block 212. The storage of such terms may comprise freezing the amount of value required to support the contract so that they cannot be used as part of a purchase transaction or allocated to another futures transaction. At the time required for execution of the contract, the customer may visit the merchant, as noted at block 214, and present the stored-value token. In many instances, the location for execution of the contract may be different from the location where the terms were initially established, reflecting the fact that execution of the contract generally involves the delivery of a commodity or other goods to the customer. For instance, the terms of the contract established as part of executing the futures transaction may have taken place a sales terminal 112 located at a sales office while execution of the contract is performed with a merchant processor 104 located at a distribution center.

To execute the contract, the customer presents the stored-value token at block 216. The account identifier provided by the stored-value token is used to retrieve contract terms from the stored-value account at the host system 138 at block 218, which may be displayed to the parties on a monitor or other output device to confirm the contract terms. At block 220, the merchant supplies the commodity or other goods in accordance with the contract terms and at block 222 the host processor 136 deducts the contract amount from the stored-value account. The frozen-value amount is also reduced by the contract amount, but may not be reduced to zero if there were multiple derivative transactions executed that resulted in freezing of multiple amounts. The amount owed to the merchant as a result of executing the contract is transmitted to an account of the merchant, usually at a financial institution, at block 224. While in some instances, this may be done substantially immediately after execution of the contract, more usually it is performed as part of a settlement process that determines how changes in value handled by the host system 138 over some time period, such as a day, should be allocated among multiple merchants and financial institutions. Performing the settlement periodically in this fashion improves efficiency since the allocation of value amounts may be performed with a minimal set of transfers that defines the result of multiple transactions, rather than requiring a separate transfer for each of those transactions.

The middle column of FIG. 2 illustrates the use of the token as part of an option transaction, in which the customer purchases the right to execute a transaction without becoming obligated to do so. For example, an option transaction may be executed by a customer making payment of a certain amount in exchange for the right, which is then recorded by the system. Thus, at block 226, the customer purchases the option and the terms of the option are stored at the host system 138 at block 228. The terms of the option generally specify a date or range of dates when the option must be exercised, if at all, and specify the cost of a commodity or other goods to be supplied upon execution. If the customer fails to exercise the option before the end of the time period where he may, the recorded terms may simply be removed by the host system 138, at least from records of currently exercisable options.

In order for the customer to execute the option, he may visit the merchant at block 230 during the valid time period. As before, the execution of the option transaction may take place at a different physical location than where it is exercised, such as where the option transaction is executed with a sales terminal at a sales office and the option itself is executed with a merchant processor 104 located at a distribution center. Similar to the steps in executing a futures contract at this point, the customer presents the stored-value token at block 232 so that the local processor may retrieve the relevant option information from the stored-value account maintained by the host system 138 at block 234. In response to the customer exercising the option at block 236, the merchant supplies the commodity or other goods at block 238 in accordance with the option terms. The host processor deducts the amount to be charged from the stored-value account at block 240 and transmits that amount to the merchant account at block 242, usually as part of a periodic settlement process as described above.

The right column of FIG. 2 illustrates the use of the token as part of a purchase transaction, highlighting the effect on the availability of stored value that may be manifested as a result of enabling futures transactions to be executed. At block 246, the customer visits and merchant and selects goods for purchase. After the customer offers the stored-value token for payment at block 248, the local processor reads the account identifier from the token and uses it to retrieve the stored-value account information at block 250. If there is not sufficient free value in the account, as checked at block 252, then the purchase transaction is refused at block 254. There may be insufficient free value if the total value in the account is less than the transaction amount; alternatively, there may be insufficient free value even if the total value exceeds the transaction amount but with a portion of it frozen for use in supporting futures transactions or certain other derivative transactions. If the stored-value account has sufficient free value, the host processor deducts the transaction amount from the stored-value account at block 256 and transmits the transaction amount to a merchant account at block 258, usually as part of a periodic settlement process.

While the above discussion has focused on instances in which the future transaction is execution of a contract for a sale of goods or services, the future transaction may more generally comprise execution of any contract that requires payment by the customer. For example, in some embodiments, the future transaction comprises the purchase of a different currency by the customer, such as illustrated by an arrangement in which a customer arranges for the future purchase of 1000 euro for a cost of 1250 US dollars. Such an arrangement has the same advantages as other futures arrangements, permitting the customer to avoid future cost fluctuations, in this instance of the purchase of currency. Furthermore, in different embodiments, the transaction may be structured as a futures transaction in which the customer obligates himself to purchase the currency, or may be structured as an options transaction in which the customer secures the right to purchase a specified amount or range of currency at a specified rate.

Figure 3:
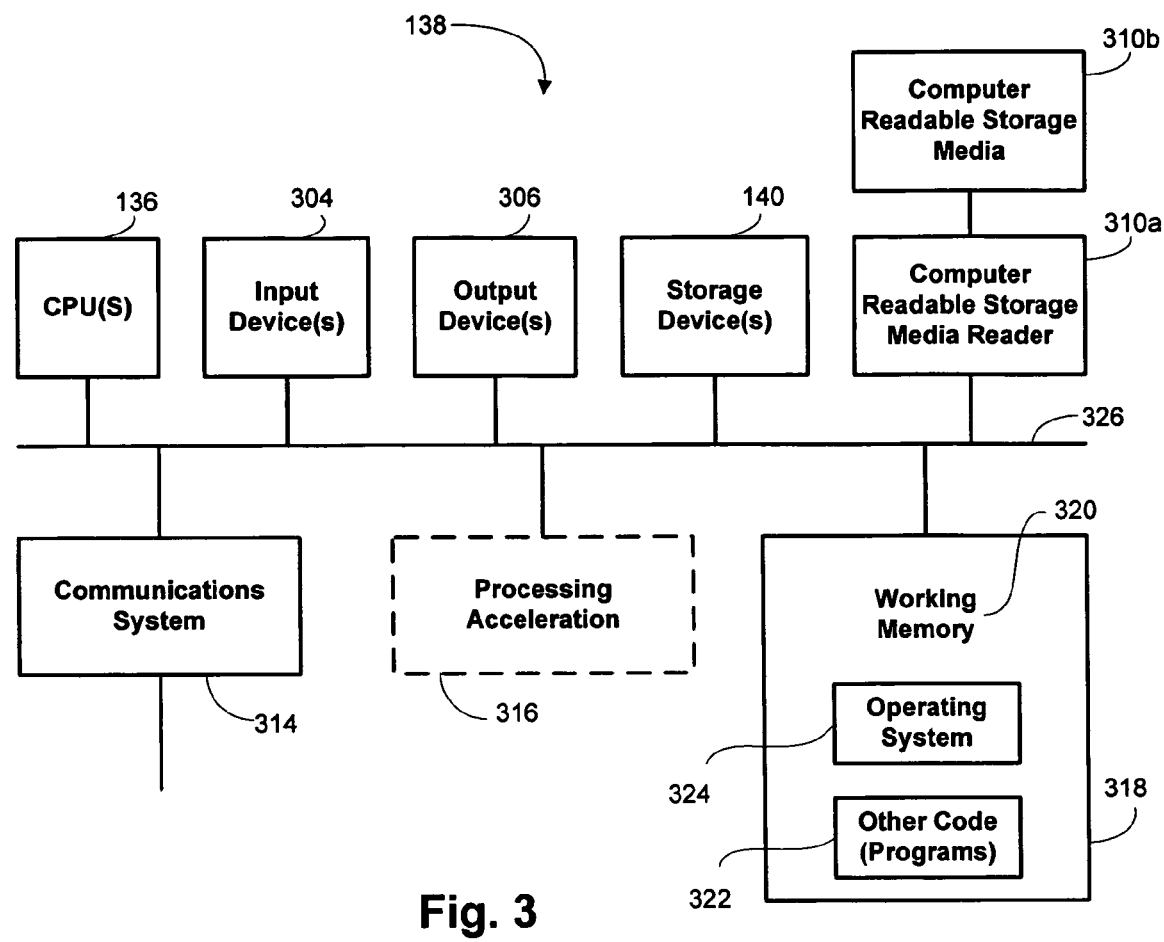
FIG. 3 is a schematic illustration of a physical structure of a host system on which methods of the invention may be embodied.

FIG. 3 provides a schematic illustration of a physical structure that may be used to implement the host system 138 in one embodiment. FIG. 3 broadly illustrates how individual system elements may be implemented in a separated or more integrated manner. The host system 138 is shown comprised of hardware elements that are electrically coupled via bus 326, including the host processor 136, an input device 304, an output device 306, the storage device 140, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the networks 144, 148, 120, and 128 illustrated in FIG. 1 to implement embodiments as described.

The host system 138 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

EXAMPLE

Figure 4B:
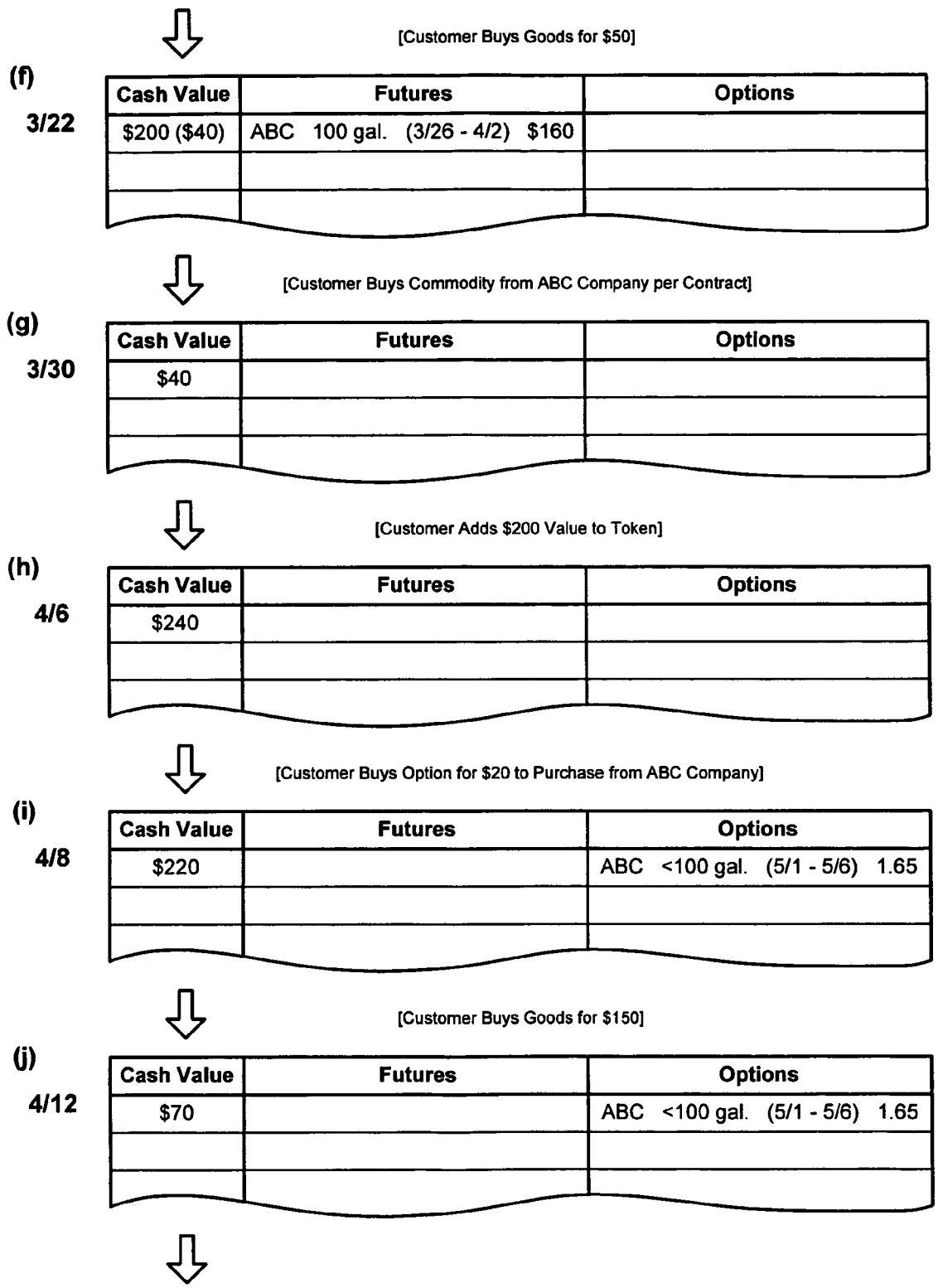
Figure 4C:
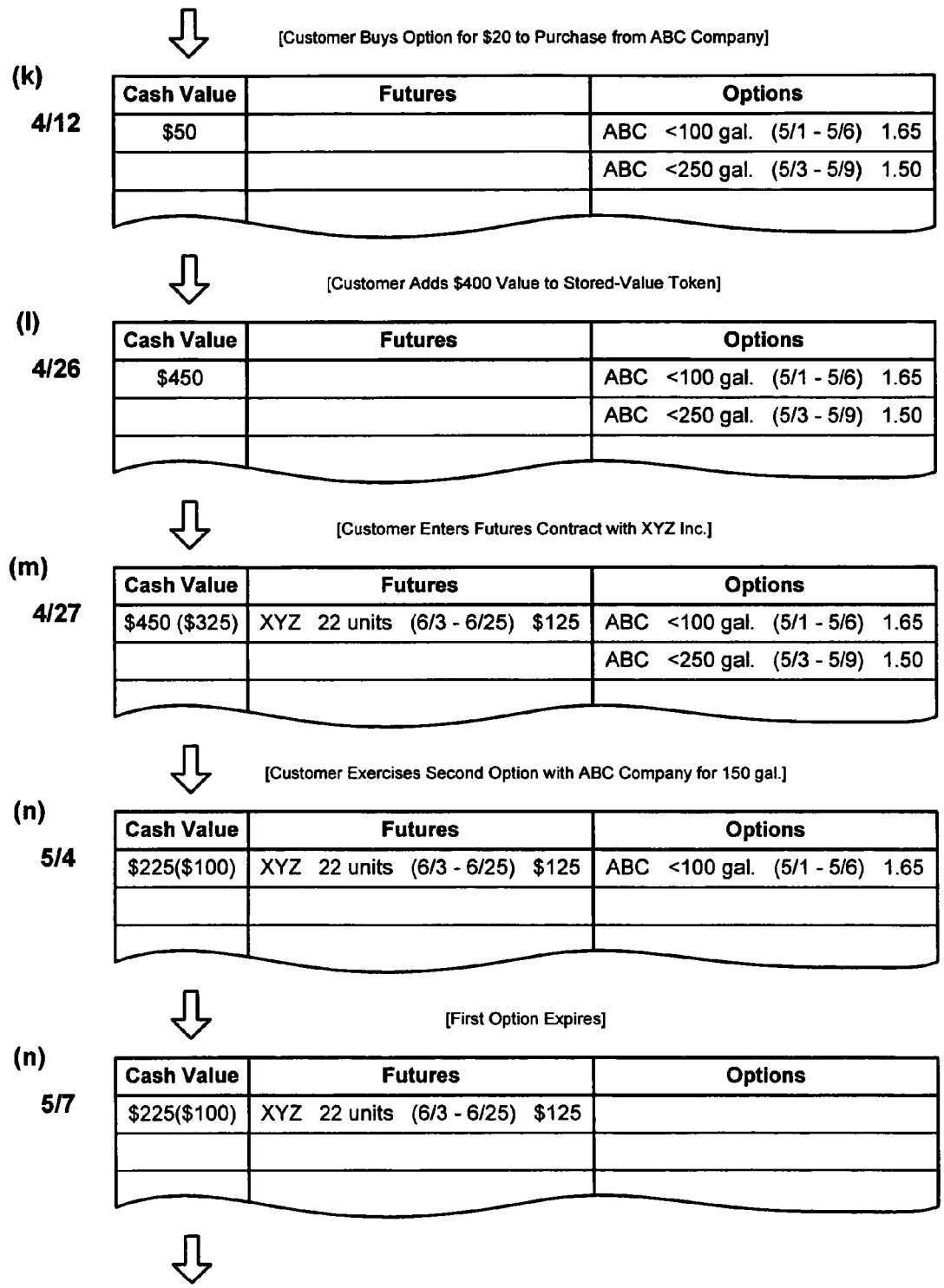

Methods of the invention as described generally in connection with FIG. 2 are illustrated with a specific example using the diagrams of FIGS. 4A-4C. These diagrams show an example of the type of information that may be maintained by the host system 138 for a particular account as the stored-value token is used by the customer to execute various derivative transactions and/or purchase transactions.

Part (a) of FIG. 4A shows an example of a record that may result when the customer initially purchases a stored-value token having a $100 value on February 1. Usually, the cost of the token to the customer is equal to its cash value, although in some instances the cost may be different. For instance, if tokens are provided as part of promotional programs, the initial cost to the customer may be less than the cash value; conversely, if tokens are sold as part of a fund-raising campaign, the initial cost to the customer may be greater than the cash value, with the excess value being donated to the fundraisers. The record for the account maintained on the data store 140 is shown to include a cash value of $100 and no other entries, meaning that the value within the account may be used to support any transaction available with the stored-value token.

Part (b) of FIG. 4A shows the result of the customer using the stored-value card on February 15 to execute a purchase transaction for the purchase of goods for $50. The cash value in the account is thus reduced by that amount to $50. A subsequent addition of $200 of value by the customer on March 1 results in the record shown in part (c) of FIG. 4A, reflecting a cash value of $250. The operations shown in parts (a)-(c) of FIG. 4A thus illustrate traditional functionality of a reloadable stored-value account.

Part (d) of FIG. 4A shows the type of information that may be maintained when the card is used for execution of a derivative transaction, in this instance a futures transaction. The futures contract that underlies the executed futures transaction is a contract between the customer and ABC Company for the purchase of 100 gallons of gasoline at a cost of $160, the purchase to take place between March 26 and April 2. The futures transaction was approved because the available value in the account of $250 was greater than the contract amount of $160. Accordingly, the total cash value in the account is unchanged at $250, but the contract amount is frozen, leaving $90 of free value. The terms of the underlying contract are also recorded.

Because the free value is only $90, an attempt by the customer to execute a purchase transaction on March 20 is rejected, even though the total value in the account exceeds the transaction amount. The account record in part (e) of FIG. 4A is thus unchanged, still reflecting the same total and free value balances and maintaining a record of terms of the futures contract. Conversely, on March 22, when the customer executes a purchase transaction to buy goods for $50 using the stored-value token, the transaction is approved because the transaction amount is less than the free value. The record is thus updated in part (f) of FIG. 4B to reflect a reduction of $50 in both the total cash value stored in the account and in the amount of cash value that is free.

On March 30, i.e. within the time window for execution of the contract underlying the futures transaction, the customer visits a distribution center of the ABC company and executes the contract, purchasing the 100 gallons of gasoline for $160. The record maintained at the host system is initially used as described in connection with FIG. 2 to verify the terms of the contact, and is updated to reflect its execution. This is illustrated with part (g) of FIG. 4B, which shows both that the record of a future contract has been removed and that the value has been decremented by the contract amount. The remaining $40 of value is all free value.

When the customer adds an additional $200 of value to the account on April 6, the record is updated to reflect the new balance as shown in part (h) of FIG. 4B. The customer subsequently purchases an option from the ABC company on April 8 for the purchase of gasoline. The terms of the option are for an amount of gasoline less than 100 gallons at a rate of $1.65 per gallon, to be purchased between May 1 and May 6. The option transaction costs the customer $20 and ensures the availability of the terms as specified, but does not bind the customer to execute the option; if circumstances are such that the gasoline is not needed, or if the price drops in the interim, the customer may simply allow the option to expire. Accordingly, the updated record shown in part (i) of FIG. 4B shows that the terms of the option have been recorded and that the cash value has been decreased by the $20 payment made as part of executing the option transaction.

Because the option does not bind the customer, the value associated with the cost of executing the option, which may be up to $165, is not frozen and the entire $220 of value remains free. Thus, when the customer attempts to execute a purchase transaction on April 12 for $150, the transaction is approved even though the remaining value of $70 shown in part (j) of FIG. 4B is insufficient to cover the maximum potential option cost.

It is also possible for the system to record information regarding multiple derivatives. While generally there is no limit on the number of derivatives that may be accommodated at any time, the execution of derivative transactions being limited only by the need to have sufficient value to support binding derivatives like futures, it is possible in some embodiments for the system to limit the number of derivatives to some predetermined number or to some predetermined maximum value. An illustration of recording information regarding multiple derivatives is provided with part (k) of FIG. 4C, which shows how the record is updated when the customer executes a second option transaction to purchase a further option from ABC Company. In this instance, the option again costs $20, which is reflected be the reduction in cash-value balance for the stored-value account, and provides for the purchase of up to 250 gallons of gasoline at $1.50 per gallon between May 3 and May 9. The availability of such a second option with a lower price per gallon and a higher potential volume may reflect external changes in market conditions so that the expenditure of $20 by the customer to secure the second option may well result in a substantial savings overall.

Although the illustrations so far have shown examples of derivative transactions executed with a single company, the ABC Company, the system may permit derivative transactions to be executed with multiple different entities. Thus, the customer may wish to execute a futures transaction with XYZ Inc. and therefore adds $400 of value to the stored value account on April 26. This increase is reflected with the updated record shown in part (l) of FIG. 4C. On April 27, execution of the futures transaction to establish a futures contract for the purchase of 22 units at a cost of $125 between June 3 and June 25 is reflected in the updated record shown in part (m) of FIG. 4C. Because the futures contract binds the customer, the $125 of value is frozen so that the free value is identified in the figure as being $325.

On May 4, when the customer has the right to execute either or both of the options that have been recorded, he chooses to execute only the second option and to purchase 150 gallons of gasoline at $1.50 per gallon. The updated record in part (n) of FIG. 4C shows the corresponding reduction in total and free values by $225 and the removal of the information regarding the second option from the record. On May 7, when the first option expires, records related to it may simply be removed since the option has not been exercised, the removal of the record thereby preventing the option from being exercised outside the agreed time period.

Use of the stored-value token may proceed in this way indefinitely, with the customer adding value as desired and using the stored value to support purchase transactions and derivative transactions that the customer wishes to execute. In addition to records of the type illustrated in FIG. 4, the system may conveniently record historical track records of costs for the various commodities and other goods that are the subject of the derivative transactions. Such records may be valuable both to the customer and to the merchants who sell such goods.

2. Currency-Exchange Implementations

Derivative transactions may also be implemented in some embodiments by using currency-exchange mechanisms. Such currency-exchange are implemented in several embodiments as an adjunct to a money-transfer mechanism, with the specific examples discussed herein being illustrative of certain more general derivative mechanisms that are within the intended scope of the invention.

Figure 5:
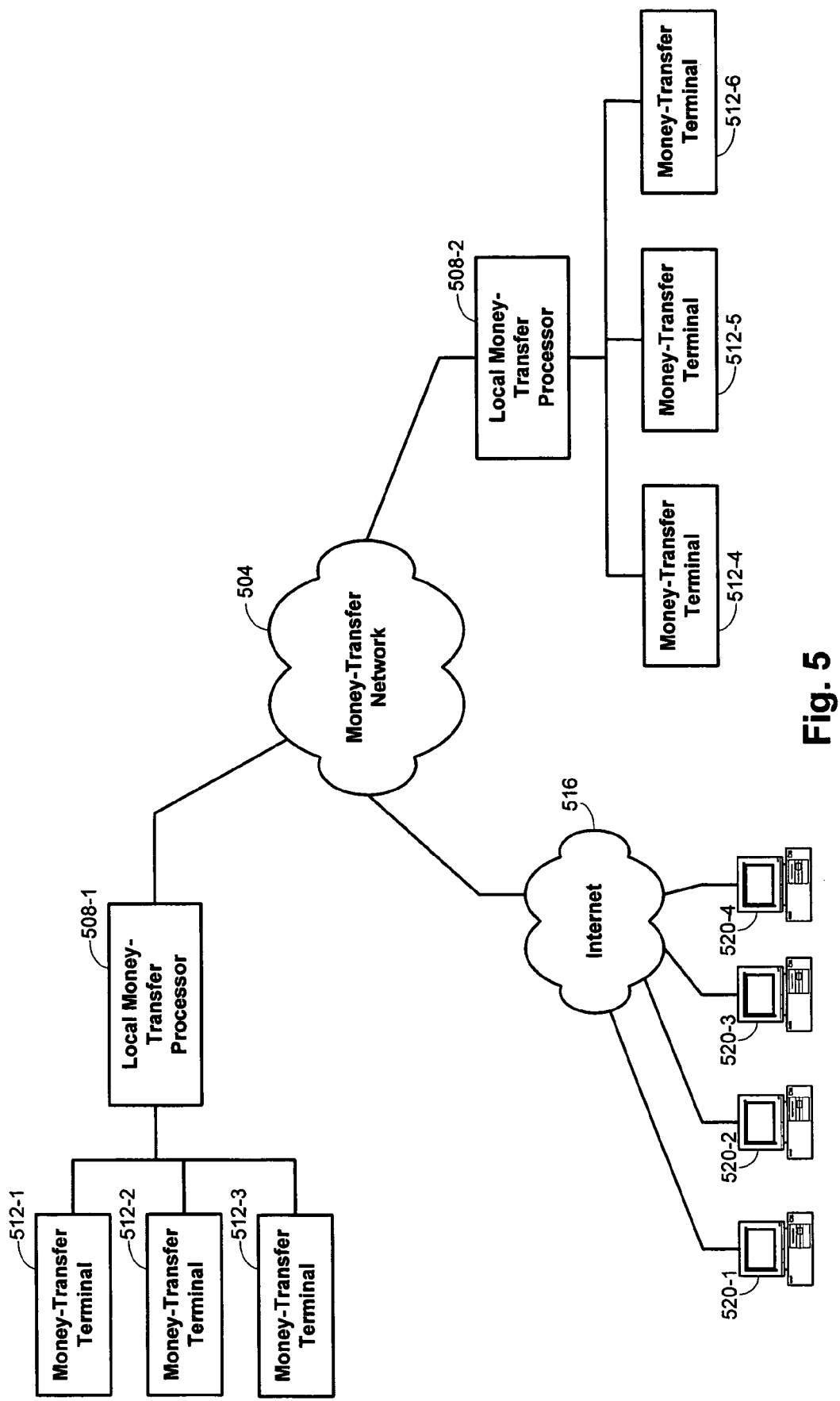
FIG. 5 is a block-diagram representation of an exemplary architecture that may be used for effecting money transfers in accordance with certain embodiments.

A structure that may be used to effect money transfers is illustrated with the block diagram of FIG. 5. The money transfers are effected through a money-transfer network 504 that provides a communications interface between various devices that may be used to initiate money transfers and to receive funds transferred in this manner. For example, local money-transfer processors 508 may be provided at various geographical locations and used to operate money-transfer terminals 512, with each of the money-transfer processors 508 being interfaced with the money-transfer network 504. In such instances, the processor 508 and terminals 512 are generally disposed at a physical location that operates as a money-transfer office. A customer may visit the office physically to arrange for funds to be transferred, providing the funds in cash or through some other mechanism, such as with a credit card or debit card. A clerk may operate one of the terminals 512 to provide information used in effecting the money transfer. Alternatively, the terminals 512 may comprise a self-service terminal operated by the customer herself in staging the money transfer. Similarly, such a physical location may be used by the recipient to receive the transferred funds with clerk-operated or with self-operated terminals to receive the funds. In embodiments where the money transfer includes a currency exchange, the physical locations of the initiating and receiving processor 508/terminal 512 are typically in different countries.

Money transfers may alternatively be staged using other types of interfaces with the money-transfer network 504. The drawing shows explicitly that the money-transfer network 504 may be interfaced with the Internet 516, which is in turn interfaced with various computational devices 520. This permits a customer to access money-transfer functionality by connecting his computational device 520 to the Internet 516 to access a web page where such functionality is implemented. With such an interface, the customer will usually provide funds for transfer by using a credit card, debit card, or similar mechanism that may be implemented electronically, instead of by providing cash. Other types of interfaces may be provided with the money-transfer network 504 in various alternative embodiments, including telephone interfaces that respond to DTMF tones, cable interfaces, wireless interfaces, and the like.

Figure 6:
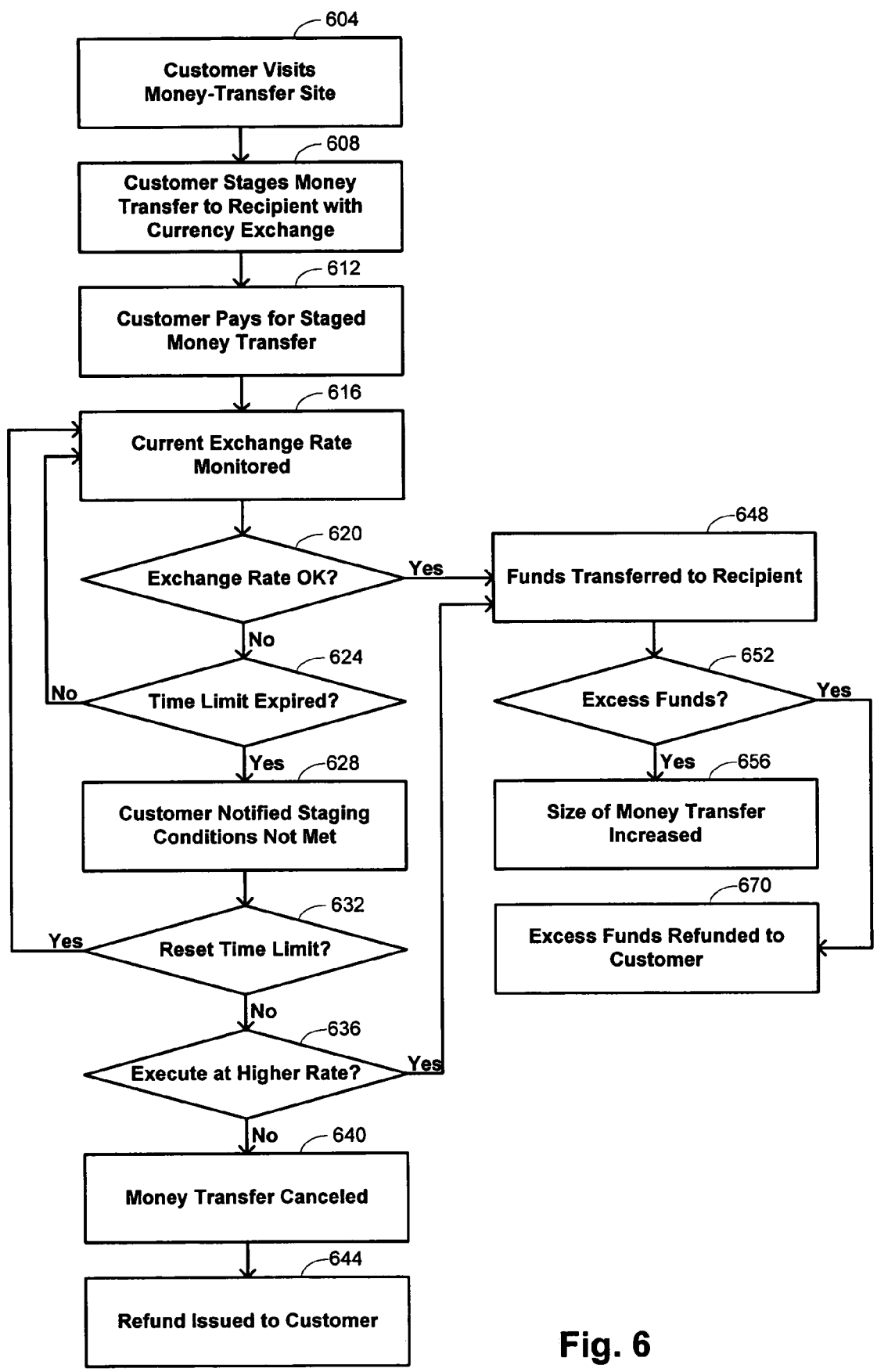
FIG. 6 is a flow diagram summarizing certain methods of the invention.

The flow diagram of FIG. 6 summarizes a number of different embodiments in which a money transfer is implemented with a derivative transaction. In these examples, the derivative transaction comprises a futures transaction linked to a currency exchange rate to be implemented with the money transfer. The money transfer is initiated with the customer visiting a money-transfer site at block 604, either by visiting a physical site where to access a money-transfer terminal 512 or by visiting a virtual site such as where the money transfer is initiated from a web site over the Internet 516. The money transfer is then staged by the customer at block 608. In staging the money transfer, the customer may provide a number of specifications, including the identity of the recipient of the money transfer, the amount of money to be transferred, the location to which the money is to be transferred, the currency in which the money to be transferred is supplied and the currency in which the money transferred is to be received, and the like. When the currency is to be changed as part of the money transfer, embodiments of the invention permit the customer to impose a limit on the exchange rate to be applied. For example, if the customer wishes to transfer US$100 to a recipient in Mexico and to have the Mexican recipient receive the transferred money in Mexican pesos, the customer could require that the exchange rate be at least 10 pesos/US$ before the transfer is executed. In other embodiments, the size of the money transfer may be specified in terms of the amount to be received by the recipient, such as by specifying that M$1000 are to be transferred.

The customer pays for the staged money transfer at block 612, generally paying a service charge in addition to the amount of money that is to be transferred. Payment may be made in a variety of different ways in different embodiments, including by cash, by credit card, by debit card, by check, or by any other suitable payment mechanism. The applicable exchange rate is accordingly monitored at block 616. Such monitoring may be substantially continuous, permitting the money transfer to be executed essentially as soon as the exchange rate becomes acceptable. Alternatively, the monitoring may be periodic so that the exchange rate is checked at different times. Such periodic monitoring, because it effectively samples the rates, may result in overlooking certain windows in which an acceptable exchange rate might have been used. At the same time, such periodic monitoring may also cause the system to respond when an even more favorable rate than the trigger value is available, while continuous monitoring would effectively always respond when the exchange rate is at the trigger value.

A check is accordingly made, for either type of monitoring, at block 620 whether the current exchange rate is consistent with the terms established by the customer at that moment in time. If not, a number of different possibilities exist for responding, depending on other conditions that may have been specified by the customer. For example, a check is made at block 624 whether a time limit imposed by the customer has expired. If not, the method may simply continue to monitor the current exchange rate at block 616 as it fluctuates.

If the time limit has expired, or if some other condition has not been satisfied to indicate that the staging conditions have not been met, the customer may be notified of that determination at block 628. Subsequent action may then proceed either on the basis of further instructions provided by the customer, on the basis of prior instructions provided by the customer at the time of staging, or in accordance with default procedures in different embodiments. For instance, the customer may indicate that the time limit is to be reset, a check for which is indicated at block 632. Such an indication may be given explicitly by the customer after notification of the failure to meet the staging conditions, or could be a way of implementing a protocol where specified time limits are restricted to integral multiples of a base time limit.

Another option that may be provided is the option to execute the money transfer at the higher exchange rate, as checked at block 636. If the customer declines to do so, either in accordance with standing or new instructions, the money transfer may be canceled at block 640 and a refund of amounts paid, perhaps less a service charge, refunded to the customer at block 644.

Thus, in the embodiments illustrated by FIG. 6, execution of the staged money transfer may occur when the exchange rate is identified as being within an acceptable range or when a decision has been made to execute the transfer notwithstanding the failure of the exchange rate to fall within the acceptable range. In either case, the funds are transferred to the recipient over the money-transfer network 504 at block

648 using methods known to those of skill in the art. Such a funds transfer applies the current currency exchange rate and may sometimes result in there being an excess of funds as a result of the fluctuation of the exchange rate. This is especially possible in embodiments where the transfer amount is specified in terms of the amount to be provided to the recipient and where the exchange rate is monitored only periodically.

A check may thus be made at block 652 whether there are excess funds, with different options being available for handling the excess funds. Such options may be selected by the customer upon notification of the existence of the excess funds, could have been identified by the customer at the time of staging the money transfer at block 608, or could be performed in accordance with a default protocol. In some instances, as indicated at block 656, the size of the money transfer may be increased in accordance with the excess funds made available by the favorable exchange rate. Alternatively, as indicated at block 670, the excess funds may be refunded to the customer.

While the above description has focused on specific embodiments where variation in exchange rates is used to trigger execution of a future money transfer, other embodiments may more generally embrace either types of future transactions that depend on a varying parameter. In particular, embodiments of the invention may more generally permit a transaction to be staged that depends on a varying parameter taking a value in a specified range, with the transaction being executed when the value of the parameter is within that range. For example, in gambling contexts, placement of a wager might be staged to be dependent on certain payoff odds or on certain point spreads. A horse-racing wager, for instance, might be staged on a particular horse to place only if the payoff odds became more favorable than 5:1. The varying odds would then be monitored and the wager placed when the condition was satisfied. Similarly, a football wager might be staged on a particular team when the point spread for payoff became more favorable than 15 points, with the wager being placed when the condition was satisfied. Still further examples of such transactions will be evident to those of skill in the art after reading this description.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for executing a money transfer of funds from a first party to a second party, the method comprising:
   receiving customer instructions at a host computer system to stage the money transfer, the instructions including specification of an amount of money to be transferred, specification of a first currency in which the funds are to be provided by the first party, specification of a second currency different from the first currency in which the funds are to be received by the second party, and specification of a trigger currency exchange rate, wherein the trigger currency exchange rate is a customer specified ratio of the first currency to the second currency that a customer requires the monitored currency exchange rate be equal to or less than for execution of the money transfer;
   receiving, by the host computer system, confirmation that the funds have been collected from the first party;
   thereafter, monitoring, by the host computer system, a currency exchange rate between the first currency and the second currency, wherein the currency exchange rate is the ratio of the first currency to the second currency; and
   determining, by the host computer system, whether the monitored currency exchange rate is equal to or less than the trigger currency exchange rate.

2. The method recited in claim 1 further comprising:
   if the monitored exchange rate is equal to or less than the trigger currency exchange rate, converting the funds from the first currency to the second currency at the monitored currency exchange rate; and
   transferring the converted funds to the control of the second party.

3. The method recited in claim 2 wherein the monitored currency exchange rate is more than the trigger currency exchange rate, the method further comprising increasing, with the host computer system, the amount of money to be transferred by an excess corresponding to a difference between the monitored currency exchange rate and the trigger currency exchange rate.

4. The method recited in claim 2 wherein the monitored currency exchange rate is less than the trigger currency exchange rate, the method further comprising initiating, by the host computer system, a refund of an excess corresponding to a difference between the monitored currency exchange rate and the trigger currency exchange rate to the customer.

5. The method recited in claim 1 wherein the amount of money to be transferred is specified in the first currency.

6. The method recited in claim 1 wherein the amount of money to be transferred is specified in the second currency.

7. The method recited in claim 1 further comprising:
   determining, by the host computer system, that the monitored currency exchange rate is greater than the trigger currency exchange rate within a predetermined initiating, by the host computer system, a refund of the funds to the customer.

8. The method recited in claim 1 further comprising:
   determining, by the host computer system, that the monitored currency exchange rate is greater than the trigger currency exchange rate within a predetermined time period; and
   monitoring, by the host computer system, the currency exchange rate between the first currency and the second currency for a second predetermined time.

9. The method recited in claim 1 further comprising:
   determining, by the host computer system, that the monitored currency exchange rate is greater than the trigger currency exchange rate within a defined time period;
   receiving additional funds;
   converting, by the host computer system, the funds and the additional funds from the first currency to the second currency at the monitored currency exchange rate; and
   transferring the converted funds to the control of the second party.

10. The method recited in claim 1 wherein the customer instructions are received at the host computer system over the Internet.

11. The method recited in claim 1 wherein the customer instructions are received at the host computer system from an in-person money-transfer location.

12. A system operable to execute a money transfer of funds from a first party to a second party, the system comprising:
   a processor; and
   a computer-readable medium in communication with the processor, the computer readable medium having stored thereon instructions for a method executable by the processor, the method comprising:

receiving customer instructions at a host system to stage the money transfer, the instructions including specification of an amount of money to be transferred, specification of a first currency in which the funds are to be provided by the first party, specification of a second currency different from the first currency in which the funds are to be received by the second party, and specification of a trigger currency exchange rate, wherein the trigger currency exchange rate is a customer specified ratio of the first currency to the second currency that a customer requires the monitored currency exchange rate be equal to or less than for execution of the money transfer of funds;

receiving confirmation at the host system that the funds have been collected from the first party;

thereafter, monitoring, with the host system, a currency exchange rate between the first currency and the second currency, wherein the currency exchange rate is a ratio of the first currency to the second currency; and determining, with the host system, whether the monitored currency exchange rate is equal to or less than the trigger currency exchange rate.

13. The system recited in claim 12 further comprising:

if the monitored exchange rate is equal to or less than the trigger currency exchange rate, converting the funds from the first currency to the second currency at the monitored currency exchange rate; and transferring the converted funds to the control of the second party.

14. The system recited in claim 13 wherein the monitored currency exchange rate is more than the trigger currency exchange rate, the method further comprising increasing, with the host system, the amount of money to be transferred by an excess corresponding to a difference between the monitored currency exchange rate and the trigger currency exchange rate.

15. The system recited in claim 13 wherein the monitored currency exchange rate is less than the trigger currency exchange rate, the method further comprising initiating, with the host system, a refund of an excess corresponding to a difference between the monitored currency exchange rate and the trigger currency exchange rate to the customer.

16. The system recited in claim 12 further comprising:

determining, with the host system, that the monitored currency exchange rate is greater than the trigger currency exchange rate within a predetermined time period; and initiating, with the host system, a refund of the funds to the customer.

17. The system recited in claim 12 further comprising:

determining, with the host system, that the monitored currency exchange rate is greater than the trigger currency exchange rate within a predetermined time period; and monitoring, with the host system, the currency exchange rate between the first currency and the second currency for a second predetermined time.

18. The system recited in claim 12 further comprising:

determining, with the host system, that the monitored currency exchange rate is greater than the trigger currency exchange rate within a defined time period;

receiving additional funds;

converting the funds and the additional funds from the first currency to the second currency at the monitored currency exchange rate; and transferring the converted funds to the control of the second party.

19. A computer-readable medium having stored thereon instructions for a method executable by a computer system, the method comprising:

receiving customer instructions at a host system to stage the money transfer, the instructions including specification of an amount of money to be transferred, specification of a first currency in which the funds are to be provided by the first party, specification of a second currency different from the first currency in which the funds are to be received by the second party, and specification of a trigger currency exchange rate, wherein the trigger currency exchange rate is a customer specified ratio of the first currency to the second currency that a customer requires the monitored currency exchange rate be equal to or less than for execution of the money transfer;

receiving confirmation at the host system that the funds have been collected from the first party;

thereafter, monitoring, with the host system, a currency exchange rate between the first currency and the second currency, wherein the currency exchange rate is the ratio of the first currency to the second currency; and determining, with the host system, whether the monitored currency exchange rate is equal to or less than the trigger currency exchange rate.

20. The computer-readable medium recited in claim 19 further comprising:

if the monitored exchange rate is equal to or less than the trigger currency exchange rate, converting the funds from the first currency to the second currency at the monitored currency exchange rate; and transferring the converted funds to the control of the second party.

* * * * *